US010823482B2

(12) United States Patent
Chamoun et al.

(10) Patent No.: US 10,823,482 B2
(45) Date of Patent: Nov. 3, 2020

(54) SYSTEMS AND METHODS FOR FREE AND POSITIVE DEFROST

(71) Applicant: Carrier Corporation, Farmington, CT (US)

(72) Inventors: Marwan Chamoun, Lyons (FR); Ruello Rubino, St. Didier de Formans (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 260 days.

(21) Appl. No.: 15/528,681

(22) PCT Filed: Nov. 24, 2014

(86) PCT No.: PCT/IB2014/002733
§ 371 (c)(1),
(2) Date: May 22, 2017

(87) PCT Pub. No.: WO2016/083858
PCT Pub. Date: Jun. 2, 2016

(65) Prior Publication Data
US 2017/0276422 A1 Sep. 28, 2017

(51) Int. Cl.
*F25B 30/02* (2006.01)
*F25D 21/02* (2006.01)
(Continued)

(52) U.S. Cl.
CPC ............... *F25D 21/02* (2013.01); *F25B 1/10* (2013.01); *F25B 30/02* (2013.01); *F25B 47/022* (2013.01);
(Continued)

(58) Field of Classification Search
CPC .......... F25D 1/10; F25D 21/02; F25D 47/022; F25D 21/04
See application file for complete search history.

(56) References Cited

U.S. PATENT DOCUMENTS 4,086,779 A 5/1978 Lewis
4,122,687 A 10/1978 McKee
(Continued)

FOREIGN PATENT DOCUMENTS

CN 102401428 A 4/2012
EP 1484561 A1 12/2004
(Continued)

OTHER PUBLICATIONS

International Search Report and Written Opinion for PCT/IB2014/002733, dated Aug. 20, 2015 in U300548PCT, 10pgs.
(Continued)

*Primary Examiner* — Elizabeth J Martin
*Assistant Examiner* — Nael N Babaa
(74) *Attorney, Agent, or Firm* — Cantor Colburn LLP

(57) ABSTRACT

A heat pump system includes a refrigerant circuit, at least one compressor, an evaporator, and a controller programmed to defrost the evaporator in a defrost mode, wherein in the defrost mode the controller is programmed to monitor the evaporator to detect frost creation thereon, and reduce the speed of the at least one compressor and/or reduce the number of some, but not all operating compressors of the at least one compressor, if frost creation is detected on the evaporator. In some embodiments, the controller is programmed to defrost the evaporator in a second defrost mode. In the second defrost mode the controller is programmed to monitor the evaporator to detect frost creation thereon, turn off the at least one compressor when frost is detected on the evaporator, and operate a fan to force ambient air over the evaporator to defrost the evaporator.

10 Claims, 2 Drawing Sheets

(51) Int. Cl.
*F25B 1/10* (2006.01)
*F25B 47/02* (2006.01)
*F25B 49/02* (2006.01)
*F25D 21/04* (2006.01)

(52) U.S. Cl.
CPC ............ *F25B 49/02* (2013.01); *F25D 21/04* (2013.01); *F25B 2313/0294* (2013.01); *F25B 2313/0315* (2013.01); *F25B 2341/0661* (2013.01); *F25B 2347/02* (2013.01); *F25B 2600/025* (2013.01); *F25B 2600/0251* (2013.01); *F25B 2600/112* (2013.01); *F25B 2700/11* (2013.01); *Y02B 30/743* (2013.01)

(56) References Cited

U.S. PATENT DOCUMENTS

| | | | |
|---|---|---|---|
| 4,295,340 A | 10/1981 | Abraham | |
| 4,375,155 A | 3/1983 | Rosanio et al. | |
| 4,951,473 A | 8/1990 | Levine et al. | |
| 5,533,357 A * | 7/1996 | Voorhis | F24F 1/027 62/277 |
| 6,334,321 B1 | 1/2002 | Said et al. | |
| 2001/0045098 A1 * | 11/2001 | Derryberry | F24F 3/14 62/139 |
| 2003/0145611 A1 | 8/2003 | McGill et al. | |
| 2007/0180838 A1 | 8/2007 | Shah | |
| 2010/0218528 A1 * | 9/2010 | Yakumaru | F25B 47/022 62/234 |
| 2012/0204581 A1 | 8/2012 | Kang et al. | |
| 2012/0266621 A1 | 10/2012 | Yokohara et al. | |
| 2013/0019617 A1 | 1/2013 | Hegar et al. | |
| 2014/0053581 A1 | 2/2014 | Cho et al. | |
| 2014/0109601 A1 | 4/2014 | Boarman | |
| 2014/0150484 A1 | 6/2014 | Boarman | |
| 2014/0157800 A1 | 6/2014 | Kim et al. | |

FOREIGN PATENT DOCUMENTS

| | | |
|---|---|---|
| EP | 1510768 A1 | 3/2005 |
| EP | 2402686 A1 | 1/2012 |
| EP | 2703754 A2 | 3/2014 |
| EP | 2722620 A2 | 4/2014 |
| EP | 2738493 A2 | 6/2014 |
| EP | 2757335 A1 | 7/2014 |
| EP | 2784414 A1 | 10/2014 |
| JP | 2014013122 A * | 1/2014 |
| JP | 2014013122 A | 1/2014 |
| KR | 100798781 B1 | 1/2008 |
| RU | 2480684 C2 | 4/2013 |
| WO | 2009158612 A2 | 12/2009 |
| WO | 2014098724 A1 | 6/2014 |

OTHER PUBLICATIONS

Russian Office Action for application RU 2017117893, dated Jun. 8, 2018, U300548RU, 7 pages.

Chinese First Office Action for application CN 201480083611.5, dated Apr. 24, 2019.

* cited by examiner

SYSTEMS AND METHODS FOR FREE AND POSITIVE DEFROST

FIELD OF THE INVENTION

The subject matter disclosed herein relates to defrosting of refrigeration systems, and in particular to efficient defrosting of HVAC heat pump systems.

BACKGROUND

Heat pump systems generally build frost on an outdoor heat exchanger coil when operating in a heating mode. This frost buildup can gradually degrade the heat exchanger and system performance in the form of heating capacity and efficiency. If the frost is not removed, it can continue to build up until the heat exchanger coil becomes completely blocked with ice. At this point, in some heat pump systems, protective devices typically cause the system to shut down. If the protective devices are not effective, equipment failure may occur.

For these reasons, it is common practice in most heat pump systems to incorporate a way to defrost. For example, most heat pump systems switch to operate in a cooling mode for short periods of time, thereby reversing the flow of refrigerant in the system with the help of a reversing valve. Also, during this defrost cycle, the outdoor fan, which blows air over the outdoor heat exchanger coil, is typically stopped. When the heat pump operates in the cooling mode without the outdoor fan running, the outdoor heat exchanger coil heats up quickly, to melt the frost.

Defrosting in this manner may have penalties. For example, running the heat pump in cooling mode while a conditioned space needs heating capacity may lead to wasted energy. As such, an associated water loop may be cooled while defrosting, which may decrease the performance (e.g., integrated heating capacity) of the heat pump, disrupt the stability of the water loop, and disturb the oil management in the heat pump which may affect reliability.

Further, regulations may impose minimum efficiency levels (e.g., Seasonal Coefficient of Performance) for heat pumps at different conditions in order to be certified (e.g., CE marking). Such efficiency levels may be difficult to attain for some systems such as fixed speed heat pump systems. The efficiency levels may be significantly impacted by degradation of evaporator performance due to the frost buildup on the outdoor coil and standard defrost modes.

Shah (U.S. Pub. 2007/0180838) describes a method for automatically adjusting the defrost interval in a heat pump system. The method utilizes measurement of the duration of the previous defrost cycle or cycles, and adjusts the time interval before initiating the next defrost cycle so that any frost buildup can be defrosted without unnecessary defrost cycles.

Said et al. (U.S. Pat. No. 6,334,321) describes a method and system for defrost control on reversible heat pumps. A control algorithm controls a coil defrosting cycle on a reversible heat pump by storing values representing performance of a clean coil without frost buildup, and monitoring those values as they evolve over time. The values are used to create a "frost factor" whose values varies between 0%, signifying a clean coil, and 100% signifying a heavily frosted coil. When the frost factor reaches a predetermined value close to 100%, the refrigerant cycle of the heat pump is reversed to achieve coil defrosting.

BRIEF DESCRIPTION OF THE INVENTION

In one aspect, a heat pump system is provided. The heat pump system includes a refrigerant circuit, at least one compressor, an evaporator, and a controller programmed to defrost the evaporator in a defrost mode, wherein in the defrost mode the controller is programmed to monitor the evaporator to detect frost creation thereon, and reduce the speed of the at least one compressor and/or reduce the number of some, but not all operating compressors of the at least one compressor, if frost creation is detected on the evaporator.

In addition to one or more of the features described above, or as an alternative, further embodiments may include wherein in the defrost mode the controller is further programmed to subsequently monitor a temperature of the evaporator to determine if the monitored temperature increases and exceeds a predetermined temperature after the compressor speed reduction and/or the reduced operating compressor numbers; wherein the controller is programmed to defrost the evaporator in a second defrost mode, wherein in the second defrost mode the controller is programmed to monitor the evaporator to detect frost creation thereon, turn off the at least one compressor when frost is detected on the evaporator, and operate a fan to force ambient air over the evaporator to defrost the evaporator; a heat transfer loop thermally coupled to the condenser, wherein the heat transfer loop circulates a heat exchange medium to a building for thermal conditioning thereof; wherein in the second defrost mode the controller is programmed to perform the steps of turning off the at least one compressor and operating the fan only if the ambient air temperature of the ambient air forced by the fan is above 0° C.; wherein the controller is programmed to defrost the evaporator using the defrost mode and the second defrost mode without utilizing a reverse cycle of the refrigerant circuit; wherein in the defrost mode the controller is programmed to maintain the at least one compressor at the reduced speed and/or reduced operating number if the monitored temperature is determined to increase and exceed the predetermined temperature; wherein the predetermined temperature is 0° C.; and/or wherein in the defrost mode the controller is programmed to monitor a temperature of the evaporator to determine if the monitored temperature increases and exceeds a predetermined temperature after the compressor speed reduction and/or the reduced operating compressor numbers, and initiate the second defrost mode if the monitored temperature is determined to be below the predetermined temperature after a predetermined amount of time.

In another aspect, a method of defrosting a heat exchanger of a refrigerant circuit having at least one compressor is provided. The method includes monitoring the heat exchanger to detect frost creation thereon, and operating, if frost is sensed on the heat exchanger, in a defrosting mode. The defrosting mode includes reducing the speed of the at least one compressor and/or reducing the number of some, but not all operating compressors of the at least one compressor, if frost is sensed on the heat exchanger.

In addition to one or more of the features described above, or as an alternative, further embodiments may include wherein the defrost mode further comprises subsequently monitoring a temperature of the heat exchanger to determine if the monitored temperature increases and exceeds a predetermined temperature after the compressor speed reduction and/or the reduced operating compressor numbers; operating in a second defrost mode if the monitored temperature is determined to be below the predetermined temperature after a predetermined amount of time, and if frost is sensed on the heat exchanger, wherein the second defrost mode includes turning off the at least one compressor, and operating a fan to force ambient air over the heat exchanger to defrost the heat exchanger; wherein the heat exchanger is an outdoor evaporator and the fan forces outdoor ambient air; wherein the second defrost mode further comprises turning off the at least one compressor and operating the fan only if the ambient air temperature of the ambient air forced by the fan is above the freezing temperature of water; and/or wherein defrosting the heat exchanger with the defrost mode and the second defrost mode is performed without reversing the cycle of the refrigerant circuit to defrost the heat exchanger.

In yet another aspect, a method of defrosting an evaporator of a heat pump system having a refrigerant circuit and a plurality of compressors is provided. The method includes monitoring the evaporator to detect frost creation thereon, and operating, if frost is detected on the evaporator, in a first defrosting mode. The first defrosting mode includes reducing the speed of at least one compressor of the plurality of compressors and/or reducing the number of some, but not all operating compressors of the plurality of compressors, if frost is detected on the evaporator, providing, while defrosting in the first defrosting mode, heating capacity to the heat pump system with the reduced speed compressors and/or the remaining operating compressors, and subsequently monitoring a temperature of the evaporator to determine if, during the defrosting in the first defrosting mode, the monitored temperature increases and exceeds a predetermined temperature after the compressor speed reduction and/or the reduced operating compressor numbers. The method includes subsequently operating in a second defrosting mode, if frost is detected on the evaporator and if the monitored temperature is determined to be below the predetermined temperature after a predetermined amount of time. The second defrosting mode includes turning off each compressor of the plurality of compressors, and operating, only when the outdoor ambient air is above the freezing temperature of water, a fan to force outdoor ambient air over the evaporator to defrost the evaporator, wherein the evaporator is defrosted using the first and second defrost modes and without reversing the cycle of the refrigerant circuit to defrost the heat exchanger.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Described herein are systems and methods for defrosting a heat pump system. The heat pump system may be defrosted in a "free defrost" mode, a "positive defrost" mode, or a combination of the free defrost mode and the positive defrost mode, without operating the heat pump system in a reverse cycle.

Figure 1:
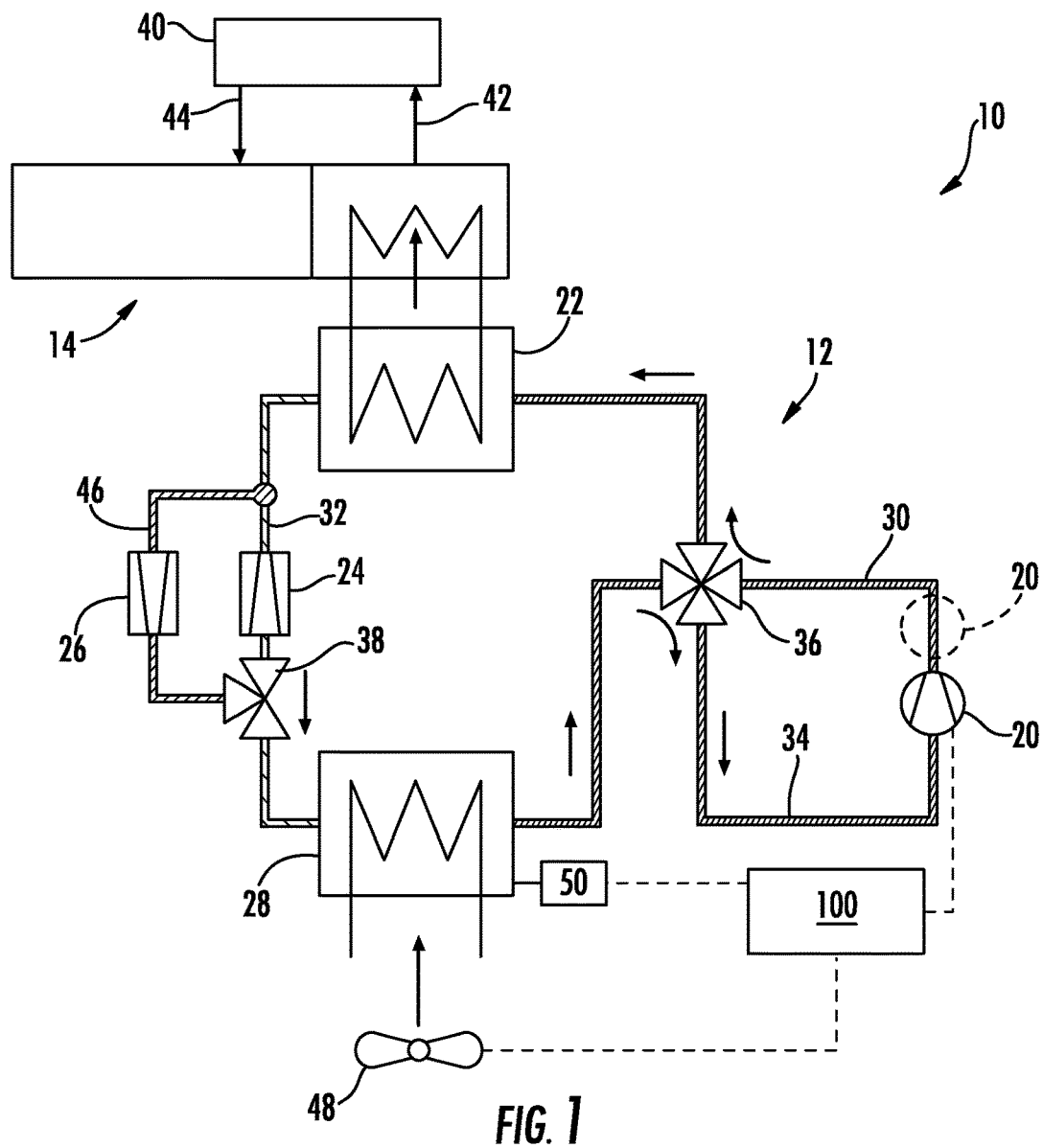
FIG. 1 is a schematic illustration of an exemplary heat pump system.

FIG. 1 illustrates an exemplary heat pump system 10 generally having a refrigerant circuit 12 for conditioning a fluid circulated in a heat transfer circuit or loop 14. In some embodiments, heat pump system 10 is an air-to-air or an air-to-water heat pump system.

Refrigerant circuit 12 generally includes one or more compressors 20, a condenser 22, expansion devices 24, 26, and one or more evaporator 28. Condenser 22 is arranged to receive high pressure refrigerant in a vapor state from compressor 20 via a discharge line 30. The refrigerant in condenser 22 is cooled using cooling water, air, or the like, in heat transfer loop 14, which carries away the heat of condensation. The refrigerant is condensed in condenser 22 and is then supplied to expansion device 24.

Expansion device 24 (e.g., an expansion valve) is mounted within a conduit line 32 and serves to throttle the liquid refrigerant down to a lower pressure and to regulate the flow of refrigerant through the system. Due to the expansion process, the temperature and pressure of the refrigerant is reduced prior to entering evaporator 28.

In evaporator 28, the refrigerant is brought into heat transfer relationship with a heat transfer medium such as circulated outdoor ambient air. The refrigerant at the lower pressure absorbs heat from the heat transfer medium and the refrigerant is subsequently vaporized. The refrigerant vapor is then drawn from evaporator 28 via compressor inlet line 34 and compressed to begin the cycle over again.

In the exemplary embodiment, heat pump system 10 includes reversing valves 36 and 38 configured to selectively switch refrigerant circuit 12 between a heating mode and a cooling mode. As illustrated, reversing valve 36 is a four-way valve and reversing valve 38 is a three-way valve. System 10 may include one or more controllers 100 programmed to selectively operate refrigerant circuit 12 reversibly between the cooling mode and the heating mode. As used herein, the term controller refers to an application specific integrated circuit (ASIC), an electronic circuit, a processor (shared, dedicated, or group) and memory that executes one or more software or firmware programs, a combinational logic circuit, and/or other suitable components that provide the described functionality. However, system 10 may have various other valving configurations that enables system 10 to function as described herein. Alternatively, heat pump system 10 may not include reversible valves 36, 38, or a reversing conduit 46 with expansion device 26.

Heat transfer loop 14 exchanges thermal energy between condenser 22 and a serviced space 40 (e.g., a building). Heat transfer loop 14 includes a supply line 42, a return line 44, and a supply fan or pump (not shown) that supplies air/water warmed by condenser 22 to serviced space 40 where a fan draws air over a coil to warm a space as known in the art. Cooled return air/water is transferred via return line 44 where it may be directed back to condenser 22. In typical space heating applications, the heat pump system is dimensioned to provide a building with sufficient heating capacity in some "design condition," which represents a severe but not uncommon outdoor air temperature condition.

During operation of heat pump system 10, frost may accumulate on coils of evaporator 28. Standard defrost methods include reversing the refrigerant cycle by actuating reversing valves 36, 38. However, such standard defrost methods may extract thermal energy from heat transfer loop 14, thereby decreasing the integrated performance of heat pump system 10. In contrast to the standard defrost method, exemplary heat pump system 10 utilizes a "free defrost" method and/or a "positive defrost" method to defrost evaporator 28.

Both the "free defrost" and the "positive defrost" methods do not reverse the refrigerant cycle, and extract the thermal energy necessary to defrost evaporator 28 from the outdoor air instead of heat transfer loop 14. However, in some embodiments, heat pump system 10 may also utilize a reverse cycle in addition to the "free defrost" and "positive defrost" methods if frost buildup on evaporator 28 is excessive.

The "free defrost" method considers the expected cycling (i.e., switching compressors off) to match a heat demand of space 40, and utilizes outdoor ambient air for defrosting. As such, system 10 reduces or prevents frost accumulation without having to reverse the refrigerant cycle. In the free defrost method, evaporator 28 is defrosted when a predetermined level or amount (e.g., a small layer) of frost accumulation is detected by controller 100, by utilizing thermal energy of outdoor air that is above the freezing point. This is in contrast to some prior art systems that wait until a significant, thick frost layer is formed. By activating an outdoor heat exchanger fan(s) 48 and turning off compressor(s) 20, cooling of the heat transfer loop 14 during the defrost cycle can be reduced or prevented.

In operation, heat pump system 10 is monitored for frost creation. For example, one or more sensors 50 may be operatively associated with evaporator 28 to detect the creation of frost on the coils or other components of evaporator 28. Sensor 50 may be a temperature sensor that senses the refrigerant temperature and/or the ambient air temperature. However, system 10 may use any suitable method to detect frost creation on evaporator 28 such as sensing the refrigerant pressure inside the evaporator, sensing an increase in the differential air-side pressure drop across the evaporator coil, etc.

When the ambient air temperature is above the freezing point of water (i.e., >0° C. at sea-level) and a predetermined level frost is detected on evaporator 28, controller 100 powers off compressor(s) 20 and activates outdoor heat exchanger fan(s) 48 to force ambient air over evaporator 28. Because the ambient air temperature is above freezing, the air flow will melt the frost formed on evaporator 28. In the exemplary embodiment, system 10 detects the beginning of frost creation (i.e., before fully formed frost) so that system 10 is only required to operate in the free defrost mode for short periods of time to eliminate the small layers of frost.

Once a predetermined frost reduction condition is met, controller 100 turns compressor(s) 20 back on and system 10 is operated normally. In the exemplary embodiment, compressor(s) 20 are turned on and the defrost cycle is terminated when a predetermined temperature of the refrigerant is reached at an appropriate point in the heat exchanger coil. For example, sensor 50 may include a coil temperature sensor to detect increased coil temperature and signal controller 100 to terminate the defrost cycle. Alternately, a pressure sensor or pressure switch can be used, or the defrost cycles may be run for a fixed duration of time. However, the free defrost cycle may be terminated when other conditions occur, such as when the differential air-side pressure drop across the evaporator coil returns below a predetermined level.

Accordingly, because compressor(s) 20 are turned off, power consumption of system 10 is reduced. Further, because system 10 is not operated in a reverse cycle, condenser 22 is not utilized as an evaporator, which would result in unwanted cooling of the fluid circulated within heat transfer loop 14.

Figure 2:
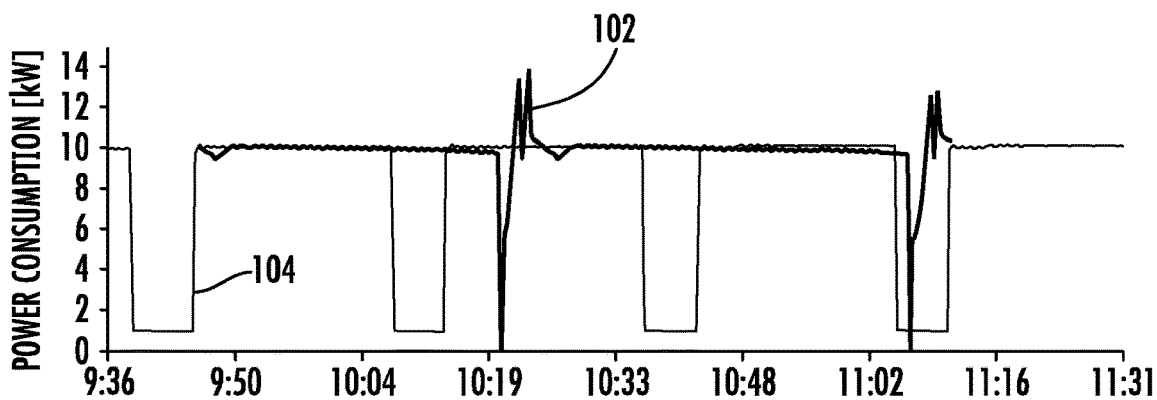
FIG. 2 illustrates a graph of an exemplary power consumption of the heat pump system cycling between a normal operating mode and a free defrost mode compared to a standard defrost mode.

FIG. 2 illustrates a graph of an exemplary power consumption of heat pump system 10 cycling between a normal operating mode and the free defrost mode (line 104) compared to cycling between the normal operating mode and a standard defrost mode (line 102) where refrigerant circuit 12 is operated in a reverse cycle.

Figure 3:
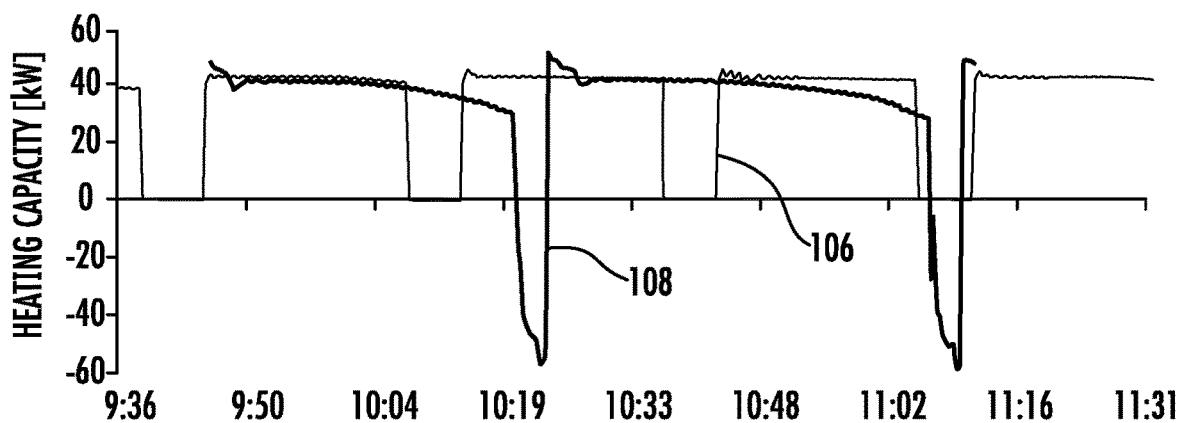
FIG. 3 illustrates a graph of an exemplary heating capacity of the heat pump system cycling between the normal operating mode and the free defrost mode compared to the standard defrost mode.

FIG. 3 illustrates a graph of an exemplary heating capacity of the heat pump system 10 cycling between the normal operating mode and the free defrost mode (line 106) compared to cycling between the normal operating mode and the standard defrost mode (line 108).

The "positive defrost" method reduces or prevents frosting by reducing the capacity of heat pump system 10 in consideration of the expected reduced heat load requirements of space 40, and utilizes outdoor ambient air for defrosting. However, although capacity is reduced, the method still provides some degree of capacity. As such, system 10 reduces the speed of compressor(s) 20 and/or shuts off some compressors 20, while still providing adequate heating capacity for heat transfer loop 14.

In operation, heat pump system 10 is monitored for frost creation. For example, sensor 50 may be operatively associated with evaporator 28 to detect the creation of frost on the coils or other components of evaporator 28. Sensor 50 may be a temperature sensor that senses the refrigerant temperature and/or the ambient air temperature. However, system 10 may use any suitable method to detect frost creation on evaporator 28, as described herein.

When the ambient air temperature is above the freezing point of water (i.e., >0° C. at sea-level) and a predetermined small level of frost is detected on evaporator 28, controller 100 reduces the speed of variable speed compressors 20 and/or reduces the number of operating compressors 20 (in a multi-compressor system). The coil temperature of evaporator 28 is then monitored to determine if the refrigerant temperature increases and exceeds 0° C. (or another predetermined value) after reducing compressor speed and/or the number of operating compressors.

If the temperature exceeds, for example, 0° C., controller 100 maintains the compressor conditions and the coil temperature is monitored to determine when the refrigerant temperature is stabilized above 0° C. In this operation, the resulting warmer evaporator coil may be enough to melt the small frost layer present while still providing some heating capacity to heat transfer loop 14. In the exemplary embodiment, compressor(s) 20 are returned to normal operation (i.e., running at normal speed and/or all compressors turned on) and the defrost cycle is terminated when a predetermined temperature of the refrigerant is reached at an appropriate point in the heat exchanger coil. For example, sensor 50 may include a coil temperature sensor to detect increased coil temperature and signal controller 100 to terminate the defrost cycle. Alternately, a pressure sensor or pressure switch can be used, or the defrost cycles may be run for a fixed duration of time. However, the free defrost cycle may be terminated when other conditions occur, such as when the differential air-side pressure drop across the evaporator coil returns below a predetermined level.

If, for a predetermined time, the refrigerant temperature remains below or equal to 0° C. or is decreasing, system 10 may be switched to free defrost mode, and compressors 20 are turned off and fan 48 is operated to heat the evaporator coil with outdoor ambient air (if above the freezing point of water).

Figure 4:
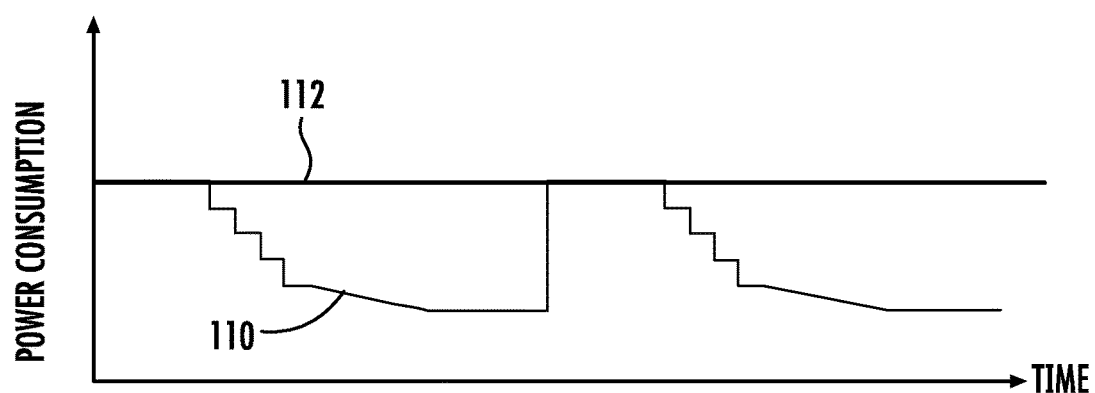
FIG. 4 illustrates a graph of an exemplary power consumption of the heat pump system cycling between the normal operating mode and a positive defrost mode compared to a standard defrost mode.

FIG. 4 illustrates a graph of an exemplary power consumption of heat pump system 10 cycling between a normal operating mode and the positive defrost mode (line 110) compared to cycling between a normal operating mode and a standard defrost mode (line 112) where refrigerant circuit 12 is operated in a reverse cycle.

Figure 5:
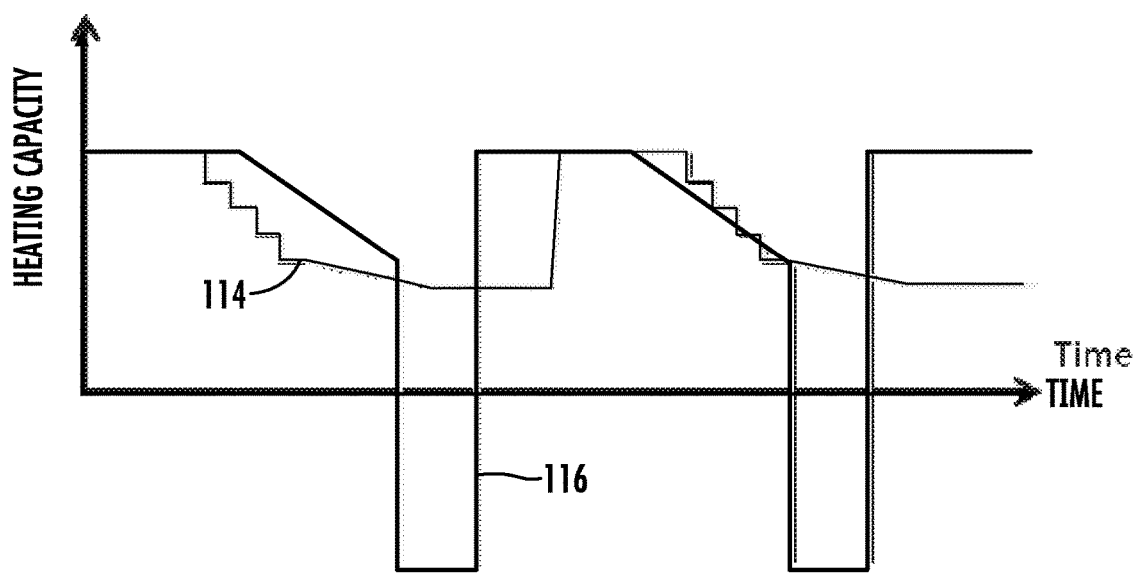
FIG. 5 illustrates a graph of an exemplary heating capacity of the heat pump system cycling between the normal operating mode and the positive defrost mode compared to a standard defrost mode.

FIG. 5 illustrates a graph of an exemplary heating capacity of the heat pump system 10 cycling between the normal operating mode and the positive defrost mode (line 114) compared to cycling between the normal operating mode and the standard defrost mode (line 116).

System 10 may use various configurations of compressors 20. For example, a first configuration includes a fixed speed single compressor, a second configuration includes a variable speed single compressor, a third configuration includes multiple fixed speed compressors, and a fourth configuration includes fixed and variable speed compressors. System 10 may be operated in the free defrost mode for all four configurations, and system 10 may be operated in the positive defrost mode for the second, third, and fourth configurations.

Described herein are systems and methods for defrosting a heat pump system. The heat pump system may be defrosted in a free defrost mode, a positive defrost mode, or a free and positive defrost mode, without operating the heat pump system in a reverse cycle. The free defrost mode includes powering off refrigerant cycle compressors and operating fans to force ambient air over a frosted evaporator for defrosting. The positive defrost mode includes reducing the speed of the compressors and/or powering off some of the total of compressors to raise the refrigerant temperature for evaporator defrosting. The free and positive defrost mode includes operating the heat pump system in both free defrost mode and positive defrost mode simultaneously or separately in any order.

As such, the Coefficient of Performance of the heat pump system may be significantly increased, with little or no impact on integrated heating capacity, and with little or no additional hardware costs. In some cases, the integrated heating capacity of the heat pump system can be enhanced at full load, which improves the cost per delivered heating capacity. The system increases the Seasonal Coefficient of Performance (e.g., by 15%). In addition to energy efficiency increase, the described defrost methods may maintain the stability of the building's air or water loop, increase the reliability of the unit, and reduce laboratory test time.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A heat pump system comprising:
 a refrigerant circuit;
 at least two compressors;
 an evaporator; and
 a controller programmed to defrost the evaporator in a first defrost mode, wherein in the first defrost mode the controller is programmed to:
 monitor the evaporator to detect frost creation thereon; and
 turn off some, but not all operating compressors of the at least two compressors, if frost creation is detected on the evaporator;
 wherein the controller is further programmed to defrost the evaporator in a second defrost mode, wherein in the second defrost mode the controller is programmed to:
 monitor the evaporator to detect frost creation thereon;
 turn off the at least two compressors when frost is detected on the evaporator; and
 operate a fan to force ambient air over the evaporator to defrost the evaporator.

2. The heat pump system of claim 1, wherein in the first defrost mode the controller is further programmed to subsequently monitor a temperature of the evaporator to determine if the monitored temperature increases and exceeds a predetermined temperature after the reduced operating compressor numbers.

3. The heat pump system of claim 1, further comprising a heat transfer loop thermally coupled to a condenser of the refrigerant circuit.

4. The heat pump system of claim 1, wherein in the second defrost mode the controller is programmed to turn off the at least two compressors and operating the fan only if the ambient air temperature of the ambient air forced by the fan is above 0° C.

5. The heat pump system of claim 1, wherein the controller is programmed to defrost the evaporator using the first defrost mode and the second defrost mode without utilizing a reverse cycle of the refrigerant circuit.

6. The heat pump system of claim 1, wherein in the first defrost mode the controller is programmed to maintain some, but not all operating compressors turned off if a temperature of the evaporator is increasing and exceeds a predetermined temperature.

7. The heat pump system of claim 6, wherein the predetermined temperature is 0° C.

8. The heat pump system of claim 1, wherein in the first defrost mode the controller is programmed to:
 monitor a temperature of the evaporator to determine if the monitored temperature increases and exceeds a predetermined temperature after turning off some, but not all operating compressors; and
 initiate the second defrost mode if the monitored temperature is determined to be below the predetermined temperature after a predetermined amount of time.

9. The heat pump system of claim 1, wherein in the first defrost mode the controller is programmed to return to the at least two compressors to a normal operation by turning on all compressors of the at least two compressors when the detected frost is melted by operating in the first defrost mode.

10. The heat pump system of claim 1, wherein in the second defrost mode the controller is programmed to return the at least two compressors to a normal operation by turning on the at least two compressors when the detected frost is melted by operating in the second defrost mode.

* * * * *